United States Patent
Yu

(10) Patent No.: US 6,201,929 B1
(45) Date of Patent: Mar. 13, 2001

(54) MULTISTAGE ROTATING SPEED CONTROL CIRCUIT FOR DC MOTOR

(75) Inventor: Shou-Te Yu, Taoyan (TW)

(73) Assignee: Delta Electronics, Inc., Taoyan Shien (TW)

( * ) Notice: Subject to any disclaimer, the term of this patent is extended or adjusted under 35 U.S.C. 154(b) by 0 days.

(21) Appl. No.: 09/246,097

(22) Filed: Feb. 8, 1999

(51) Int. Cl.<sup>7</sup> ....................................................... H02P 7/18
(52) U.S. Cl. ........................... 388/806; 388/827; 318/268
(58) Field of Search .................................... 318/508, 509, 318/514–516, 551, 552, 268, 449, 461; 388/801, 806, 815, 827, 826, 828; 341/159

(56) References Cited

U.S. PATENT DOCUMENTS

| | | | | |
|---|---|---|---|---|
| 4,250,437 | * | 2/1981 | Morton et al. | 299/826 |
| 4,771,845 | * | 9/1988 | Shimizu | 318/473 X |
| 5,197,858 | * | 3/1993 | Cheng | 318/473 X |
| 5,525,881 | * | 6/1996 | Desrus | 318/471 |
| 5,818,379 | * | 10/1998 | Kim | 341/159 |
| 5,880,678 | * | 3/1999 | Yu | 340/671 |
| 5,929,581 | * | 7/1999 | Brocklin et al. | 318/471 |
| 6,002,356 | * | 12/1999 | Cooper | 341/160 |

* cited by examiner

Primary Examiner—Robert E. Nappi
Assistant Examiner—Rina I. Duda

(57) ABSTRACT

The present invention provides a multistage rotating speed control circuit which is connected to a positive DC supply voltage and controls the rotating speed of the DC motor.

The multistage rotating speed control circuit comprises a digital control circuit and a driving circuit. Besides, it comprises an input voltage modifying circuit which delivers an input voltage; a reference voltage generating circuit which provides a fixed number of reference voltage; and a comparing circuit consisting of the fixed number of comparators, each of which receiving the aforementioned input voltage at its positive end and a different reference voltage generated by the reference voltage generating circuit at its negative end, delivering an output digital signal based on the comparison result of the two input signals, these output digital signals collectively making up an input digital signal set for the digital control circuit.

11 Claims, 3 Drawing Sheets

MULTISTAGE ROTATING SPEED CONTROL CIRCUIT FOR DC MOTOR

BACKGROUND OF THE INVENTION

The present invention relates to a multistage rotating speed control circuit for a DC motor.

Concerning the rotating speed control of a DC motor, there are two kinds of control circuits: (1) the first kind of control circuit can provide only fixed rotating speed of a DC motor; (2) the second kind of control circuit can provide multistage rotating speed of a DC motor. Since the rotating speed of a DC motor cannot be adjusted using the former control circuit, an additional speed change device is necessary to enable multistage rotating speed of a DC motor, which is not convenient. On the other hand, the latter utilizes the 8255A interface circuit used in the 8-bit microprocessor 8085A and Z80 to achieve the function of multistage rotating speed control of a DC motor, which requires complicated circuitry and high cost.

FIG. 1 is a block diagram showing the digital rotating speed control circuit for a DC motor of the U.S. patent application. Ser. No. 08/988,051, wherein a digital circuit is used to control the rotating speed of a DC motor. The digital circuit receives an input digital signal set (CON1~CONn) which can be generated by, for example, a microcomputer accompanied with an A/D interface card. However, it requires high cost because the system is complicated.

In view of the above, the purpose of the present invention is to provide a circuit composed of simple electric elements, by which an input digital signal set (CON1~CONn) for a digital control circuit can be generated.

SUMMARY OF THE INVENTION

In order to solve the aforementioned problem, the present invention provides a simple and low cost circuit with a small volume, by which multistage rotating speed control for a DC motor is possible.

In accordance with the first aspect of the present invention, there is provided a multistage rotating speed control circuit of a DC motor which is connected between a positive and a negative DC supply voltages and controls the rotating speed of the motor, comprising: a digital control circuit which receives a digital signal set and delivers a corresponding current based on the digital signal set; and a driving circuit connected to the digital control circuit, which controls the rotating speed of the DC motor based on the output current of the digital control circuit. It is characterized by further comprising: an input voltage modifying circuit which delivers an output voltage; a reference voltage generating circuit which provides a fixed number of reference voltage; and a comparing circuit consisting of the fixed number of comparators, each of which receives the output voltage from the input voltage modifying circuit at its first end and a different reference voltage generated by the reference voltage generating circuit at its second end, and delivers an output digital signal based on the comparison result of the two input signals, these output digital signals collectively making up an input digital signal set of the digital control circuit.

The second aspect of the present invention is directed to the multistage rotating speed control circuit for a DC motor according to the first aspect of the invention, wherein the input voltage modifying circuit comprises: a fixed resistor with the first terminal connected to the positive DC supply voltage; and a variable resistor wherein the first terminal, which is the output terminal of the input voltage modifying circuit, is connected to the second terminal of the fixed resistor and its second terminal is connected to the negative DC supply voltage.

The third aspect of the invention is directed to the multistage rotating speed control circuit for a DC motor according to the first aspect of the invention, wherein the input voltage modifying circuit is composed of an external voltage source.

The fourth aspect of the invention is directed to the multistage rotating speed control circuit for a DC motor according the first aspect of the invention, wherein the reference voltage generating circuit comprises: a first resistor set consisting of the fixed number of resistors wherein the first terminal of each resistor is connected to the positive DC supply voltage; and a second resistor set consisting of the fixed number of resistors wherein the first terminal of each resistor is connected to the second terminal of a different one of the first resistor set and its second terminal is connected to the negative DC supply voltage.

The fifth aspect of the invention is directed to the multistage rotating speed control circuit for a DC motor according the first aspect of the invention, wherein the reference voltage generating circuit is composed of a plurality of external voltage sources.

DESCRIPTION OF THE PREFERRED EMBODIMENTS

Figure 1:
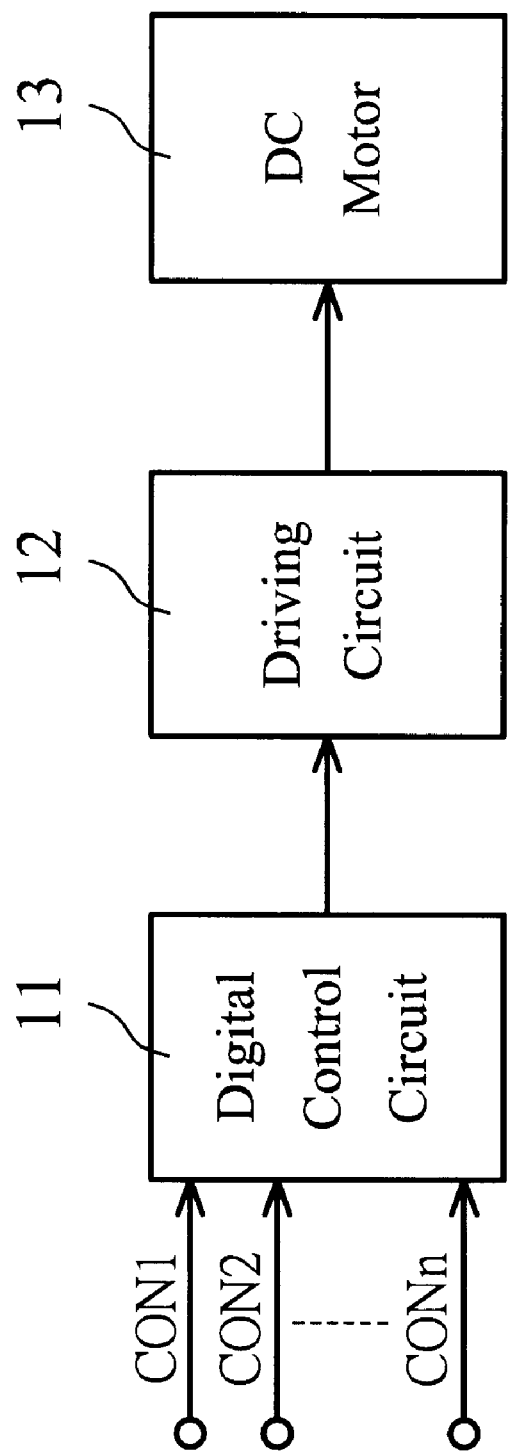
FIG. 1 is a block diagram showing the digital rotating speed control circuit for a DC motor of the U.S. patent application. Ser. No. 08/988,051.
Figure 2:
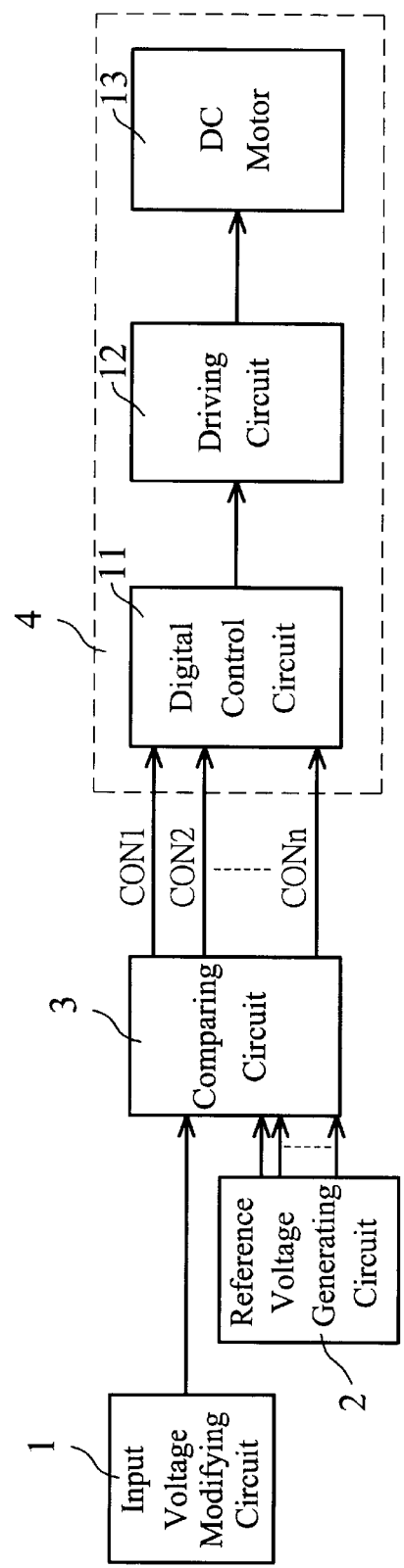
FIG. 2 is a block diagram showing the multistage rotating speed control circuit for a DC motor of the preferred embodiment in accordance with the present invention.

Referring to FIG. 2, a multistage rotating speed control circuit for a DC motor in accordance with the present invention comprises: an input voltage modifying circuit 1, a reference voltage generating circuit 2, a comparing circuit 3, and a digital rotating speed control device 4 for a DC motor. As can be seen from the circuit diagram in FIG. 2, the digital rotating speed control device 4 for a DC motor is the same as the prior art disclosed in U.S. patent application. Ser. No. 08/988,051.

The input voltage modifying circuit 1 delivers a voltage signal to the comparing circuit 3, the reference voltage generating circuit 2 simultaneously delivers n different voltage signals to the comparing circuit 3 (n: positive integer). The comparing circuit 3 is composed of n comparators, each comparator receives the output voltage of the input voltage modifying circuit 1 and one different output voltage from the reference voltage generating circuit 2. The output voltages of all the comparators collectively make up a digital signal set with length n of the comparing circuit 3. The digital signal set (CON1~CON3) serves as the input digital signal set for the digital rotating speed control device 4.

Figure 3:
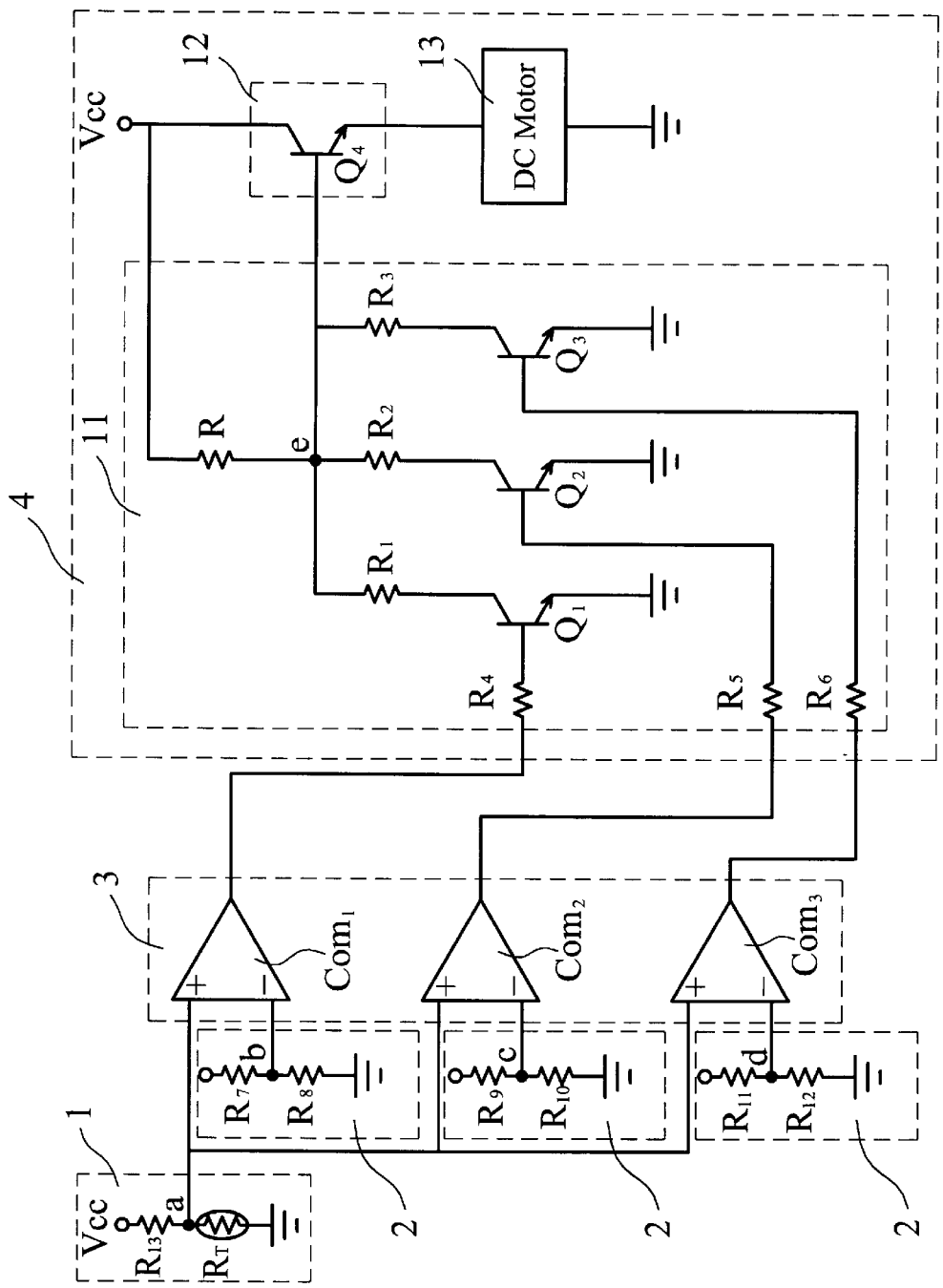
FIG. 3 is a circuit diagram showing the multistage rotating speed control circuit for a DC motor of the preferred embodiment in accordance with the present invention.

Referring to FIG. 3, the input voltage modifying circuit 1 comprises a fixed resistor $R_{13}$ and a thermistor $R_T$ in series connection between a positive DC supply voltage Vcc and ground. The potential at node a is taken as the output signal of the input voltage modifying circuit 1. The reference voltage generating circuit 2 comprises three voltage dividers, which are configured by three pairs of resistors ($R_7R_8$), ($R_9R_{10}$), ($R_{11}R_{12}$) in series connection between a positive DC supply voltage Vcc and ground. The potentials at nodes b, c and d are taken as three output signals of the reference voltage generating circuit 2. The comparing circuit 3 is composed of three comparators $Com_1$, $Com_2$, and $Com_3$, which compare the potentials at nodes a and b, the potentials at nodes a and c, and the potentials at nodes a and d, respectively. These comparators collectively deliver three digital signals based on the comparison results of the two input signals of the three comparators. The ON/OFF states of transistors Q1, Q2 and Q3 are determined subsequently, which is described hereinafter.

Referring to FIG. 3 again, the potential at node a is:

$$Va=Vcc\times(R_T/(R_T+R_{13}))$$

Since voltage Va varies with the resistance of thermistor $R_T$ and the resistance of thermistor $R_T$ changes with temperature, voltage Va varies with temperature. Each comparator receives voltage Va at its positive end and receives a different voltage provided by the reference voltage generating circuit 2 at its negative end. As stated in the preceding paragraph, the reference voltage generating circuit 2 is composed of three voltage dividers in series connection between a positive DC supply voltage Vcc and ground. Nodes b, c and d, whose potentials are denoted by Vb, Vc and Vd respectively, are output terminals of the reference voltage generating circuit 2. Without loss of generality, let Vb>Vc>Vd.

By choosing circuit parameters adequately, transistors $Q_1$, $Q_2$ $Q_3$ and $Q_4$ can be operated as follows: (1) transistors $Q_1$, $Q_2$ and $Q_3$ are operated at either a saturation region or a cutoff region; (2) transistor $Q_4$ is operated at an active region, wherein the emitter current increases with the potential difference between the base and the emitter. The following explanation is proceeded in accordance with four situations.

(1) Va>Vb>Vc>Vd: comparators $Com_1$, $Com_2$ and $Com_3$ respectively deliver a sufficiently positive voltage to turn on transistors $Q_1$, $Q_2$ and $Q_3$. Under the situation, the potential $Ve_1$ at node e is:

$$Ve_1 \approx Vcc\times(R_{123}/(R_{123}+R))$$

where $R_{123}$ is the parallel resistance of $R_1$, $R_2$, and $R_3$, $$R_{123}=1/(1/R_1+1/R_2+1/R_3)$$

The current flowing through the DC motor 13 becomes $I_1$ due to transistor $Q_4$.

(2) Vb>Va>Vc>Vd: comparators $Com_2$ and $Com_3$ respectively deliver a sufficiently positive voltage to turn on transistors $Q_2$ and $Q_3$ whereas comparator Com, delivers a negative voltage to transistor $Q_1$, which turns off transistor $Q_1$. Under the situation, the potential $Ve_2$ at node e is:

$$Ve_2 \approx Vcc\times(R_{23}/(R_{23}+R))$$

where $R_{23}$ is the parallel resistance of $R_2$ and $R_3$, $$R_{23}=1/(1/R_2+1/R_3)$$

Under the situation, the current flowing through the DC motor 13 becomes $I_2$ due to transistor $Q_4$.

(3) Vb>Vc>Va>Vd: comparator $Com_3$ delivers a sufficiently positive voltage to turn on transistor $Q_3$, whereas the comparators $Com_1$ and $Com_2$ respectively deliver negative voltages to transistors $Q_1$ and $Q_2$, which turn off transistors $Q_1$ and $Q_2$. Under the situation, the potential $Ve_3$ at node e is:

$$Ve_3 \approx Vcc\times(R_3/(R_3+R))$$

The current flowing through the DC motor 13 becomes $I_3$ due to transistor $Q_4$.

(4) Va>Vb>Vc>Vd: comparators $Com_1$, $Com_2$ and $Com_3$ respectively deliver negative voltages to transistors $Q_1$, $Q_2$ and $Q_3$, which turn off transistors $Q_1$, $Q_2$ and $Q_3$. Under the situation, the potential $Ve_4$ at node e is:

$$Ve_4=Vcc$$

The current flowing through the DC motor 13 becomes $I_4$ due to transistor $Q_4$.

Since transistor $Q_4$ is operated in active region, it can be derived that the higher the potential at node e, the larger the current flowing through transistor $Q_4$ and the current flowing toward DC motor 13.

Since the equivalent resistance becomes smaller as the number of parallel resistors is increased, the following conditions hold:

Ve4>Ve3>Ve2>Ve1;

$I_4>I_3>I_2>I_1$.

Therefore, four different rotating speeds of DC motor 13 can be generated by using the resistance variation of the thermistor $R_T$.

While the preferred embodiment and example of the present invention have been described using specific terms, such description is for illustrative purpose only, and it is to be understood that changes and variations may be made without departing from the spirit or scope of the following claims.

What is claimed is:

1. A multistage rotating speed control circuit for a DC motor which is connected between a positive and a negative DC supply voltages and controls the rotating speed of the motor, said multistage rotating speed control circuit comprising:

a digital control circuit which receives a digital signal set and delivers a corresponding current based on the digital signal set;

a driving circuit connected to said digital control circuit, which controls the rotating speed of the DC motor based on the output current of said digital control circuit, an input voltage modifying circuit which delivers an output voltage;

a reference voltage generating circuit which provides a fixed number of reference voltages; and a comparing circuit including the fixed number of comparators, each of which receives the output voltage from said input voltage modifying circuit at its first end and a different reference voltage generated by said reference voltage generating circuit at its second end, and delivers an output digital signal based on the comparison result of the two input signals, these output digital signals collectively making up an input digital signal set of said digital control circuit.

2. The multistage rotating speed control circuit for a DC motor according to claim 1, wherein said input voltage modifying circuit comprises:

a fixed resistor with the first terminal connected to the positive DC supply voltage; and a variable resistor wherein the first terminal, which is the output terminal of said input voltage modifying circuit, is connected to the second terminal of said fixed resistor and its second terminal is connected to the negative DC supply voltage.

3. The multistage rotating speed control circuit for a DC motor according to claim 1, wherein said input voltage modifying circuit is composed of an external voltage source.

4. The multistage rotating speed control circuit for a DC motor according to claim 1, wherein said reference voltage generating circuit comprises:

a first resistor set consisting of the fixed number of resistors wherein the first terminal of each resistor is connected to the positive DC supply voltage; and a second resistor set consisting of the fixed number of resistors wherein the first terminal of each resistor is connected to the second terminal of a different one of the first resistor set and its second terminal is connected to the negative DC supply voltage.

5. The multistage rotating speed control circuit for a DC motor according to claim 1, wherein said reference voltage generating circuit is composed of a plurality of external voltage sources.

6. The multistage rotating speed control circuit according to claim 1, wherein said driving circuit comprises an active region transistor.

7. The multistage rotating speed control circuit according to claim 6, wherein said active region transistor outputs an emitter current to control the rotating speed of the DC motor based on the output current of said digital control circuit.

8. The multistage rotating speed control circuit according to claim 1, wherein said digital control circuit comprises the fixed number of saturation/cutoff region transistors.

9. The multistage rotating speed control circuit according to claim 8, wherein said digital control circuit further includes the fixed number of resistors, each of said saturation/cutoff region transistors is connected to conduct a current through one of said resistors based on the comparison result of one of said comparators.

10. The multistage rotating speed control circuit according to claim 9, wherein the currents flowing through said resistors collectively makes up the output current of said digital control circuit.

11. A multistage rotating speed control circuit for a DC motor which is connected between a positive and a negative DC supply voltages and controls the rotating speed of the motor, said multistage rotating speed control circuit comprising:

a digital control circuit comprising a fixed number of saturation/cutoff region transistors for receiving a digital signal set and delivering a corresponding output current based on the digital signal set;

a driving circuit comprising an active region transistor connected to said saturation/cutoff region transistors to control the rotating speed of the DC motor based on the output current of said saturation/cutoff region transistors;

an input voltage modifying circuit which delivers an output voltage;

a reference voltage generating circuit which provides the fixed number of reference voltages; and a comparing circuit including the fixed number of comparators, each of which receives the output voltage from said input voltage modifying circuit at its first end and a different reference voltage generated by said reference voltage generating circuit at its second end, and delivers an output digital signal based on the comparison result of the two input signals, these output digital signals collectively making up an input digital signal set of said digital control circuit;

wherein said active region transistor outputs an emitter current depending on a potential difference between a base and an emitter of the active region transistor to control the rotating speed of the DC motor.

\* \* \* \* \*